(12) United States Patent
Mata

(10) Patent No.: US 11,875,780 B2
(45) Date of Patent: Jan. 16, 2024

(54) VOICE RECOGNITION PERFORMANCE CONSTELLATION GRAPH

(71) Applicant: Vocollect, Inc., Pittsburgh, PA (US)

(72) Inventor: Brian Mata, Pittsburgh, PA (US)

(73) Assignee: Vocollect, Inc., Pittsburgh, PA (US)

( * ) Notice: Subject to any disclaimer, the term of this patent is extended or adjusted under 35 U.S.C. 154(b) by 250 days.

(21) Appl. No.: 17/176,821

(22) Filed: Feb. 16, 2021

(65) Prior Publication Data

US 2022/0262341 A1    Aug. 18, 2022

(51) Int. Cl.
  *G10L 15/01* (2013.01)
  *G06T 11/20* (2006.01)
  *G10L 15/22* (2006.01)
  *G10L 25/06* (2013.01)

(52) U.S. Cl.
  CPC ............ *G10L 15/01* (2013.01); *G06T 11/206* (2013.01); *G10L 15/22* (2013.01); *G10L 25/06* (2013.01)

(58) Field of Classification Search
  None
  See application file for complete search history.

(56) References Cited

U.S. PATENT DOCUMENTS

| 5,787,395 | A | * | 7/1998 | Minamino | G10L 15/08 704/255 |
| 6,006,183 | A | * | 12/1999 | Lai | G10L 15/22 704/E15.04 |
| 6,185,530 | B1 | * | 2/2001 | Ittycheriah | G10L 15/10 707/999.005 |
| 6,249,763 | B1 | * | 6/2001 | Minematsu | G10L 15/07 704/254 |
| 6,269,335 | B1 | * | 7/2001 | Ittycheriah | G10L 15/22 704/E15.04 |
| 6,601,027 | B1 | * | 7/2003 | Wright | G10L 15/063 704/E15.04 |
| 6,839,669 | B1 | * | 1/2005 | Gould | G10L 15/22 704/E15.04 |

(Continued)

FOREIGN PATENT DOCUMENTS

| EP | 0924687 A2 | 6/1999 |
| KR | 10-1317339 B1 | 10/2013 |
| WO | 2020/230933 A1 | 11/2020 |

OTHER PUBLICATIONS

European Search Report and Search Opinion received for EP Application No. 22155801.8, dated Jul. 20, 2022, 8 pages.

(Continued)

*Primary Examiner* — Jonathan C Kim
(74) *Attorney, Agent, or Firm* — Alston & Bird LLP

(57) ABSTRACT

Various embodiments described herein relate to determining and providing user-specific feedback based on an analysis of audible input sessions performed by a user. In this regard, a set of term recognition structures that each comprise a plurality of term data objects and a respective confidence score for each term data object are generated. For at least one pairing of term data objects of a predefined term glossary, a correlation coefficient value for the respective pairing is determined. In accordance with determining that the correlation coefficient value for the at least one pairing satisfies a predefined threshold a generate a visualization is generated and displayed that includes an indication of the term data objects of the at least one pairing.

20 Claims, 7 Drawing Sheets

(56) References Cited

U.S. PATENT DOCUMENTS

| | | | | |
|---|---|---|---|---|
| 6,952,675 | B1* | 10/2005 | Tahara | G10L 15/08 |
| | | | | 704/255 |
| 8,214,210 | B1* | 7/2012 | Woods | G10L 15/08 |
| | | | | 704/7 |
| 9,786,273 | B2* | 10/2017 | Longé | G10L 15/18 |
| 10,152,298 | B1* | 12/2018 | Salvador | G06F 3/167 |
| 11,580,959 | B2* | 2/2023 | Freed | G10L 15/063 |
| 2001/0018654 | A1* | 8/2001 | Hon | G10L 15/08 |
| | | | | 704/E15.014 |
| 2002/0087315 | A1* | 7/2002 | Lee | H04M 3/4938 |
| | | | | 704/E15.044 |
| 2003/0078777 | A1* | 4/2003 | Shiau | G10L 15/30 |
| | | | | 704/E15.047 |
| 2003/0187643 | A1* | 10/2003 | Van Thong | G10L 15/08 |
| | | | | 704/254 |
| 2008/0167872 | A1* | 7/2008 | Okimoto | G10L 15/22 |
| | | | | 704/E15.047 |
| 2009/0004633 | A1* | 1/2009 | Johnson | G09B 19/04 |
| | | | | 434/169 |
| 2011/0282667 | A1* | 11/2011 | Hernandez-Abrego | |
| | | | | G10L 15/19 |
| | | | | 704/E15.005 |
| 2012/0016671 | A1* | 1/2012 | Jaggi | G10L 15/22 |
| | | | | 704/235 |
| 2012/0303371 | A1* | 11/2012 | Labsky | G10L 15/14 |
| | | | | 704/E13.011 |
| 2014/0012575 | A1* | 1/2014 | Ganong, III | G10L 15/22 |
| | | | | 704/239 |
| 2015/0243278 | A1* | 8/2015 | Kibre | G10L 15/187 |
| | | | | 704/243 |
| 2016/0217125 | A1* | 7/2016 | Levit | G06F 40/40 |
| 2016/0267128 | A1* | 9/2016 | Dumoulin | G06F 16/3329 |
| 2019/0130901 | A1* | 5/2019 | Kato | G10L 15/07 |
| 2020/0160866 | A1* | 5/2020 | Szymanski | G06N 3/02 |
| 2021/0027786 | A1* | 1/2021 | Evans | G09B 19/04 |
| 2021/0158804 | A1* | 5/2021 | Tiwari | G10L 15/183 |
| 2022/0101835 | A1* | 3/2022 | Freed | G10L 15/063 |
| 2022/0262341 | A1* | 8/2022 | Mata | G06T 11/206 |

OTHER PUBLICATIONS

Networkx, "Drawing", NetworkX, Network Analysis in Python, 8 pgs, (2004-2023), [Retrieved from the Internet Aug. 1, 2023: <URL: https://networkx.org/documentation/stable/reference/drawing.html>].

Numpy, "Numpy.corrcoef", NumPy, 4 pgs, (2008-2022), [Retrieved from the Internet Aug. 1, 2023: <URL: https://numpy.org/doc/stable/reference/generated/numpy.corrcoef.html>].

Wikipedia, "Pearson correlation coefficient", Wikipedia, The Free Encyclopedia, 14 pgs., (Jul. 27, 2023), [Retrieved from the Internet Aug. 1, 2023: < URL: https://en.wikipedia.org/wiki/Pearson_correlation_coefficient>].

EP Office Action dated Oct. 16, 2023 for EP Application No. 22155801, 6 page(s).

* cited by examiner

VOICE RECOGNITION PERFORMANCE CONSTELLATION GRAPH

TECHNICAL FIELD

The present disclosure relates generally to voice recognition, and more particularly to determining and providing user-specific feedback based on an analysis of audible input sessions performed by a user.

BACKGROUND

Voice recognition software and devices may be used to improve efficiency in performing certain tasks. However, misrecognition of a word spoken by a user occurs in some examples. Through applied effort, ingenuity, and innovation, many of these identified problems have been solved by developing solutions that are included in embodiments of the present disclosure, many examples of which are described in detail herein.

BRIEF SUMMARY

In accordance with some embodiments, an apparatus is provided. The apparatus includes at least one processor and at least one non-transitory memory including program code. The at least one non-transitory memory and the program code are configured to, with the processor, cause the apparatus to generate a set of term recognition structures based on one or more audible input sessions performed by a user, each term recognition structure comprising a plurality of term data objects and a respective confidence score for each term data object. The at least one non-transitory memory and the program code are configured to, with the processor, cause the apparatus to determine, for at least one pairing of term data objects of a predefined term glossary, a correlation coefficient value for the respective pairing.

The at least one non-transitory memory and the program code are configured to, with the processor, cause the apparatus to determine, for the at least one pairing, whether the correlation coefficient value for the at least one pairing satisfies a predefined threshold. The at least one non-transitory memory and the program code are configured to, with the processor, cause the apparatus to, in accordance with determining that the correlation coefficient value for the at least one pairing satisfies the predefined threshold, generate a visualization comprising an indication of the term data objects of the at least one pairing. The at least one non-transitory memory and the program code are configured to, with the processor, cause the apparatus to cause display of the visualization at a device associated with the user.

In some embodiments of the apparatus, the visualization comprises a constellation graph comprising a plurality of nodes with at least two nodes of the plurality of nodes being visually connected, wherein the at least two nodes each indicative of the term data objects of the at least one pairing.

In some embodiments, the at least one non-transitory memory and the program code are further configured to, with the processor, cause the apparatus to, in an instance in which the at least one pairing fails to satisfy the predefined threshold, cause display of a user interface element indicative of the performance of the respective audible input session by the user.

In some embodiments, the at least one non-transitory memory and the program code are further configured to, with the processor, cause the apparatus to store a predefined term glossary set comprising at least one predefined term glossary. In some embodiments, the at least one non-transitory memory and the program code are further configured to, with the processor, cause the apparatus to access the predefined term glossary set in response to generating the set of term recognition structures.

In some embodiments of the apparatus, the plurality of term data objects of a respective term recognition structure of the set of term recognition structures comprise each term object of a respective predefined term glossary.

In some embodiments of the apparatus, each term recognition structure is associated with a respective audible input session performed by the user. In some embodiments of the apparatus, the correlation coefficient value is determined based at least on the respective confidence scores of the term data objects in the set of term recognition structures.

In accordance with some embodiments, a method is performed. The method includes generating a set of term recognition structures based on one or more audible input sessions performed by a user, each term recognition structure comprising a plurality of term data objects and a respective confidence score for each term data object. The method also includes determining, for at least one pairing of term data objects of a predefined term glossary, a correlation coefficient value for the respective pairing.

The method also includes determining, for the at least one pairing, whether the correlation coefficient value for the at least one pairing satisfies a predefined threshold. The method also includes, in accordance with determining that the correlation coefficient value for the at least one pairing satisfies the predefined threshold, generating a visualization comprising an indication of the term data objects of the at least one pairing. The method also includes causing display of the visualization at a device associated with the user.

In some embodiments of the method, the visualization comprises a constellation graph comprising a plurality of nodes with at least two nodes of the plurality of nodes being visually connected, wherein the at least two nodes each indicative of the term data objects of the at least one pairing.

In some embodiments, the method also includes, in an instance in which the at least one pairing fails to satisfy the predefined threshold, causing display of a user interface element indicative of the performance of the respective audible input session by the user.

In some embodiments, the method also includes storing a predefined term glossary set comprising at least one predefined term glossary. In some embodiments, the method also includes accessing the predefined term glossary set in response to generating the set of term recognition structures.

In some embodiments of the method, the plurality of term data objects of a respective term recognition structure of the set of term recognition structures comprise each term object of a respective predefined term glossary.

In some embodiments of the method, each term recognition structure is associated with a respective audible input session performed by the user. In some embodiments of the method, the correlation coefficient value is determined based at least on the respective confidence scores of the term data objects in the set of term recognition structures.

In accordance with some embodiments, a computer program product is provided. The computer program product includes at least one non-transitory computer-readable storage medium having computer-readable program code portions stored therein, the computer-readable program code portions comprising an executable portion configured to generate a set of term recognition structures based on one or more audible input sessions performed by a user, each term recognition structure comprising a plurality of term data objects and a respective confidence score for each term data object. The computer-readable program code portions comprising the executable portion are also configured to determine, for at least one pairing of term data objects of a predefined term glossary, a correlation coefficient value for the respective pairing.

The computer-readable program code portions comprising the executable portion are also configured to determine, for the at least one pairing, whether the correlation coefficient value for the at least one pairing satisfies a predefined threshold. The computer-readable program code portions comprising the executable portion are also configured to, in accordance with determining that the correlation coefficient value for the at least one pairing satisfies the predefined threshold, generate a visualization comprising an indication of the term data objects of the at least one pairing. The computer-readable program code portions comprising the executable portion are also configured to cause display of the visualization at a device associated with the user.

In some embodiments of the computer program product, the visualization comprises a constellation graph comprising a plurality of nodes with at least two nodes of the plurality of nodes being visually connected, wherein the at least two nodes each indicative of the term data objects of the at least one pairing.

In some embodiments, the computer-readable program code portions comprising the executable portion are also configured to, in an instance in which the at least one pairing fails to satisfy the predefined threshold, cause display of a user interface element indicative of the performance of the respective audible input session by the user.

In some embodiments, the computer-readable program code portions comprising the executable portion are also configured to store a predefined term glossary set comprising at least one predefined term glossary. In some embodiments, the computer-readable program code portions comprising the executable portion are also configured to access the predefined term glossary set in response to generating the set of term recognition structures.

In some embodiments of the computer program product, the plurality of term data objects of a respective term recognition structure of the set of term recognition structures comprise each term object of a respective predefined term glossary.

In some embodiments of the computer program product, each term recognition structure is associated with a respective audible input session performed by the user. In some embodiments of the computer program product, the correlation coefficient value is determined based at least on the respective confidence scores of the term data objects in the set of term recognition structures.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
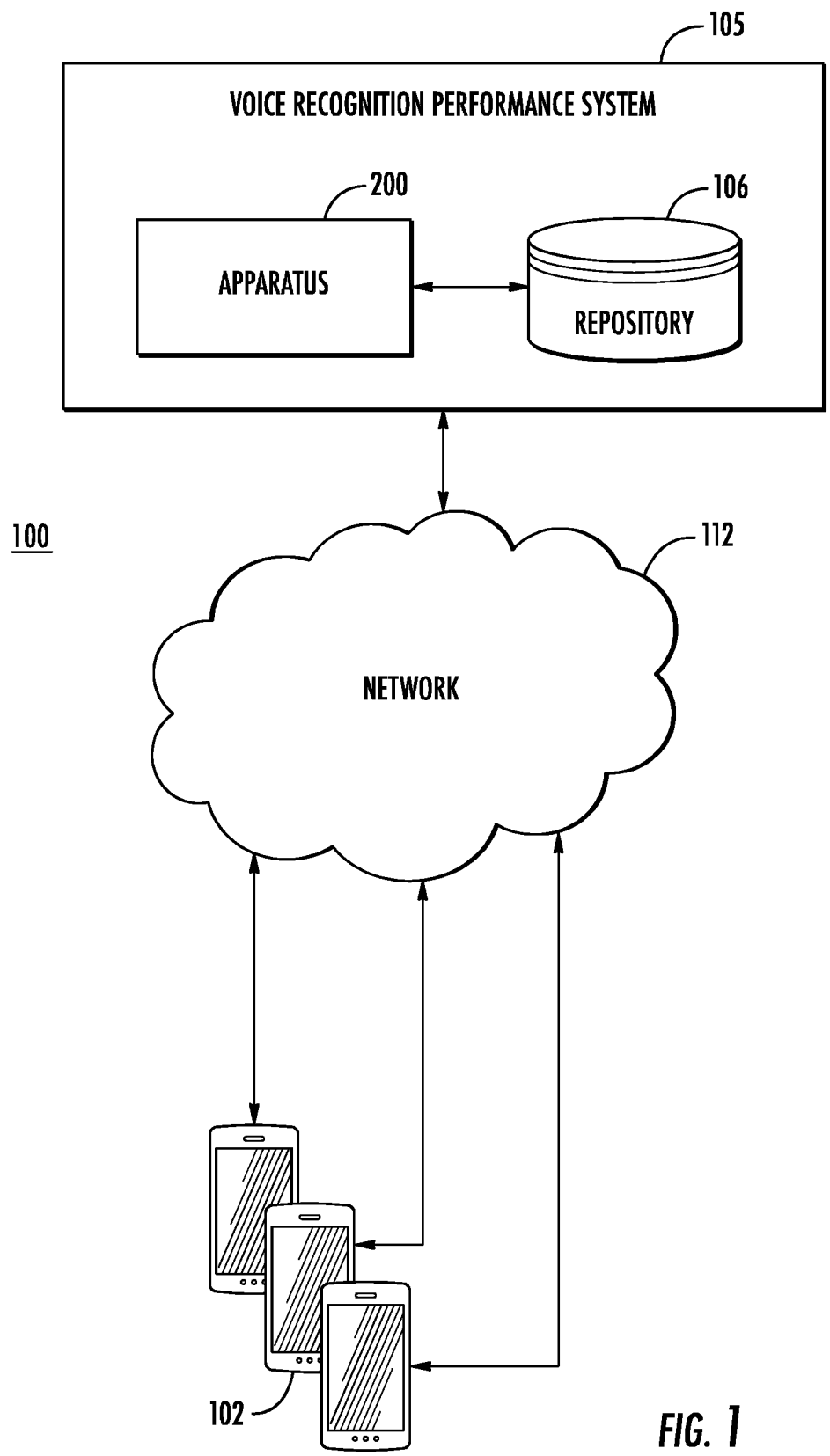
FIG. 1 illustrates a block diagram of a system configured to communicate via a network, in accordance with one or more embodiments described herein.

Various embodiments of the present invention now will be described more fully hereinafter with reference to the accompanying drawings, in which some, but not all embodiments of the invention are shown. Indeed, the invention can be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout. As used herein, the terms "data," "content," "information," "electronic information," "signal," "command," and similar terms may be used interchangeably to refer to data capable of being captured, transmitted, received, and/or stored in accordance with various embodiments of the present disclosure. Thus, use of any such terms should not be taken to limit the spirit and scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, repeaters, and/or the like, sometimes referred to herein as a "network." Similarly, where a first computing device is described herein as sending data to a second computing device, it will be appreciated that the data may be sent or transmitted directly to the second computing device or may be sent or transmitted indirectly via one or more intermediary computing devices, such as, for example, one or more servers, remote servers, cloud-based servers (e.g., cloud utilities), relays, routers, network access points, base stations, hosts, repeaters, and/or the like.

In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The phrase 'one or more' includes a function being performed by one element, a function being performed by more than one element, e.g., in a distributed fashion, several functions being performed by one element, several functions being performed by several elements, or any combination of the above.

It will also be understood that, although the terms "first," "second," etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

As used herein, the term "computer-readable storage medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable storage medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein can also include, for example, a baseband integrated circuit or applications processor integrated circuit for a mobile phone or a similar integrated circuit in a server, a cellular network device, other network device (such as a core network apparatus), field programmable gate array, and/or other computing device.

The term "audible input session" refers to a session or period of time in which a user provides an audible input (e.g., voice input) to a device and/or software executing on the device (e.g., voice recognition software) that is configured to process the audible input and, in some embodiments, output text and/or perform operations based on the audible input. In some embodiments, an audible input session may be automatically initiated upon the user beginning to speak and may be terminated once the user stops speaking (e.g., upon silence occurring for a predefined amount of time). As such, the audible input session may comprise a word, a phrase, or a series of words/phrases. In some embodiments, an audible input session may be initiated and/or terminated based on a signal received by the user (e.g., through selection of a user interface element associated with the voice recognition software).

As used herein, the term "term data object" refers to structured data that is representative of a particular term or word. Term data objects may be associated with a predefined term glossary. A "predefined term glossary" refers to a data structure that includes one or more predetermined term data objects. A predefined term glossary, in some embodiments, may be associated with a particular task that is to be performed by a user of the voice recognition software at the client device 102. For example and in the context of a warehouse, the task of counting inventory may be associated with a predefined term glossary containing term data objects indicative of numbers (e.g., "one," "two," etc.). In this regard, voice recognition software executing on a client device may utilize the predefined term glossary containing term data objects indicative of numbers when attempting to determine a word that the user spoke during an audible input session.

As described above, voice recognition technology may provide a more efficient means for performing certain tasks. For example, voice recognition may be utilized by various industries in order to promote more efficiency in the workplace. As one example, voice recognition may be utilized in the context of a warehouse, wherein certain tasks may need to be performed in an efficient manner. Such tasks may include performing inventory counts of the items stored in the warehouse, noting attributes of the items such as damage, defects, brand names, model numbers, and/or the like, reporting problems or incidents within the warehouse such as spilled liquid or defective machinery, keeping record of available space within the warehouse to store incoming inventory, completing an order for additional inventory, taking attendance of an employee roster, recording time and/or hours worked, and/or other similar tasks. In this regard, an employee of the warehouse may utilize voice recognition software stored on a computing device to perform these tasks. The computing device may be, for example, a mobile phone, tablet, Personal Digital Assistant (PDA), laptop, smartwatch, and/or other similar device equipped and/or embodied with an input device, such as a microphone and/or the like.

By way of further example, an employee performing an inventory count of an item may dictate a number to computing device executing voice recognition software (e.g., through a microphone of the user device). For example, the user may say "seventeen" in order to record an inventory count of seventeen for a particular item, stock keeping unit (SKU), or the like. In other examples, an employee may dictate voice commands to control various machinery within the warehouse, such as robotic devices, conveyor systems, and/or the like.

However, in some examples, user experience of the voice recognition device and/or software may be hindered or otherwise interrupted by misrecognitions of a word or phrase spoken by the user. For example, a misrecognition may take place due to a system error or may take place due to the user improperly enunciating a particular word or phrase, not speaking the word loudly enough, using an improper inflection when speaking the word, and/or the like. Such issues may, in some examples, be more prevalent in situations where personal protective equipment and/or facemasks are used. Without transparency as to why a misrecognition occurred, the user may be left confused and/or unsure of how to proceed. That is, without an indication as to why the word was misrecognized, the user is not able to adjust behavior so as to improve or otherwise optimize future recognitions. For example, the user may continue to encounter misrecognitions by the voice recognition software and/or device, leading to an unnecessary increase in processing resources and time.

To address these and/or other issues, an apparatus, method, and computer program product are disclosed herein that analyze a plurality of audible input sessions performed by a user and provide user-specific feedback based on the analysis by generating and displaying targeted visualizations in order to improve future interactions between the user and the voice recognition software and/or device. Accordingly, reduced usage of network bandwidth and processing resources is achieved by generating tailored guidance that informs users on how future misrecognitions can be prevented, leading to increased productivity and efficiency of both the user and the voice recognition software and/or device.

Referring now to FIG. 1, an example environment 100 within which embodiments disclosed herein may operate is illustrated. It will be appreciated that the environment 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of such an environment, numerous other configurations may also be employed.

In some embodiments, a voice recognition performance system 105 is configured to interact with one or more computing devices 102. In some embodiments, the computing device 102 is a client device, such as a computing device owned or otherwise operated by a user, such as an employee, or the like. Example computing devices 102 may include, without limitation, smart phones, tablet computers, laptop computers, wearables, personal computers, enterprise computers, and/or the like.

In some embodiments, the computing device 102 executes voice recognition software, such as one or more software applications related to voice recognition which a user may interact and perform audible input sessions with. In some embodiments, the voice recognition performance system 105 is configured to receive, generate, and/or cause transmission of data, such as data related to one or more audible input sessions and generated visualizations, to the computing device(s) 102 (e.g., a client device). In some example embodiments, a user that is operating the computing device may participate in an audible input session (e.g., by speaking a word or phrase or series of words and phrases that are to be converted from voice to text by the voice recognition software executing on the device).

In some examples and at the conclusion of one or more audible input sessions, the voice recognition performance system 105 may receive or otherwise access data associated with the one or more audible input sessions performed by a user via the computing device 102. That is, in some examples, and separate and independent from the generation of text and/or other processes from voice recognition, the voice recognition performance system 105 may analyze the one or more audible input sessions performed by a user so as to assess the voice recognition output.

In some embodiments, each audible input session may be associated with a predefined term glossary. For example, voice recognition software executing on a client device of a user performing assessments of damage to particular inventory may utilize a predefined term glossary containing term data objects indicative of types of damage when attempting to determine a word that the user spoke during an audible input session. For example, such a predefined term glossary may include term data objects indicative of words related to types of damage, such as "electrical," "mechanical," "exterior," "interior," "physical," and/or the like.

As another example, voice recognition software executing on a client device of a user taking attendance and/or performing a roll call may utilize a predefined term glossary containing term data objects indicative of first and/or last names when attempting to determine a word that the user spoke during an audible input session. For example, in the context of a warehouse, such a predefined term glossary may include term data objects indicative of first and/or last names of known employees on a roster for a company associated with the warehouse. In other words, a particular predefined term glossary may be utilized when a certain task requiring voice recognition is being performed by the user.

In various embodiments, the one or more predefined term glossaries may be stored as a predefined term glossary set, or collection of predefined term glossaries. In this regard, in some embodiments, the voice recognition performance system 105, such as the processor 202, memory 204, and/or the like, is configured to is configured to store a predefined term glossary set comprising at least one predefined term glossary that is associated with or otherwise determined for a particular user. For example, in some embodiments, a predefined term glossary set may be stored in memory 204 and/or repository 106. Alternatively or additionally, the predefined term glossaries may be learned, such as via supervised or unsupervised learning, based on the ongoing monitoring of a user's inputs and any subsequent edits to output text.

In some embodiments, the data related to the one or more audible input sessions for the particular user that is received or accessed by the voice recognition performance system 105 comprises confidence scores that have been predetermined for a plurality of term data objects. In this regard, in some embodiments, during an audible input session, the voice recognition software executing on the client device 102 may determine confidence scores for each term data object in a predefined term glossary associated with the audible input session. That is, each time the user speaks, a confidence score is determined for each term data object in a predefined term glossary, and an accepted term data object (e.g., the word determined to be spoken by the user by the voice recognition software) is determined based on having a confidence score higher than the other term data objects in the predefined term glossary. For example, in the above example case wherein a user is performing assessments of damage to particular inventory, if a user speaks the word "interior," the term data object indicative of the term "interior" in a predefined term glossary containing term data objects indicative of types of damage may, in some examples, receive a higher confidence score, such as 0.90, whereas the other terms of the predefined term glossary related to types of damage, such as "electrical," "mechanical," "exterior," and "physical," may receive a lower confidence score, such as a confidence score that is lower than 0.90.

In some embodiments, confidence scores may comprise a normalized value, e.g., a value between zero (0) and (1), with a confidence score closer to one (1) for a term data object indicating that term was likely to be the accepted term data object, and a confidence score closer to zero (0) indicating that term was less likely to be the accepted term data object. Additional description with respect to the confidence score values for respective term data objects is further described with reference to FIG. 3.

In various embodiments, once the data related to one or more audible input sessions is received or otherwise accessed by the voice recognition performance system 105, the data may be processed by the voice recognition performance system 105 in order to generate a set of term recognition structures, with each term recognition structure comprising a plurality of term data objects and a respective confidence score for each term data object. In one or more embodiments, the term recognition structures may be generated in a manner such that each term recognition structure represents a respective audible input session, and the term data objects within a term recognition structure include each term data object of a respective predefined term glossary associated with the audible input session. Example term recognition structures are further described below with reference to FIG. 4A.

In various embodiments, the voice recognition performance system 105 may then analyze the set of term recognition structures to determine, for at least one pairing of term data objects of a predefined term glossary, a correlation coefficient value for the respective pairing. As one example, for a predefined term glossary containing four term data objects indicative of the terms "up," "down," "left," and "right," the voice recognition performance system 105 may determine pairings of all the terms data object in the predefined term glossary, resulting in six pairings: "up" and "down," "up" and "left," "up" and "right," "down" and "left", "down" and "right", and "left" and "right."

A "correlation coefficient value" refers to measure of a statistical relationship, or association, between two variables, or in other words, how similar two values tend to be. In some embodiments, correlation coefficient values are determined based on the generated set of term recognition structures. In this regard, a correlation coefficient value for a pairing of term data objects in a predefined term glossary may be determined based at least on respective confidence scores for the term data objects in the set of term recognition structures. For example, a correlation coefficient value may be determined for the pairing of term data objects "up" and "down" based on the confidence scores assigned (e.g., based on predefined correlation coefficient values, learned correlation coefficient values, or the like) to "up" and "down" in the set of term recognition structures. In this regard, the generated set of term recognition structures and at least one predefined term glossary may be used to determine correlation coefficient values.

In various embodiments, a pairing of terms having a high coefficient correlation value indicates that the terms have a high chance to be commonly misrecognized for each other by the voice recognition software when spoken by the user, and are likely to be misrecognized for the other during future audible input sessions if the user were to continue to provide voice input in the same manner. In this regard, in various embodiments, the voice recognition performance system 105 further analyzes the correlation coefficient values determined for pairings of term data objects to identify correlation coefficient values that satisfy a predefined threshold.

In this regard, in various embodiments, in response to identifying one or more pairings of term data objects having correlation coefficient values that satisfy the predefined threshold, voice recognition performance system 105 generates visualizations for the identified pairings. In some embodiments, a generated visualization comprises one or more constellation graphs that maps the pairings together via connected nodes in order to provide user-specific visual feedback regarding terms that the user may be experiencing or is likely to experience misrecognitions for by the voice recognition software when performing audible input sessions at the computing device 102. Example constellation graph visualizations are further described below with reference to FIGS. 5A, 5B, and 5C.

In some embodiments, the voice recognition performance system 105 communicates with the computing device(s) 102 using a network 104. The network 104 includes any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the voice recognition performance system 105.

In some embodiments, the voice recognition performance system 105 includes or is otherwise in communication with a repository 106. In some embodiments, the repository 106 may store received data from the one or more client devices 102, such as data associated with one or more audible input sessions performed by a user. In some embodiments, the repository 106 is configured to store received data as well as one or more predefined term glossary sets, further described below. Additional data, such as output data generated by the voice recognition performance system such as determined correlation coefficient data and/or generated visualizations may also be stored in repository 106.

The repository 106 may include one or more storage units, such as multiple distributed storage units that are connected through a computer network. Each storage unit in the storage repository 106 may store at least one of one or more data assets and/or one or more data about the computed properties of one or more data assets. Moreover, each storage unit in the repository 106 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Figure 2:
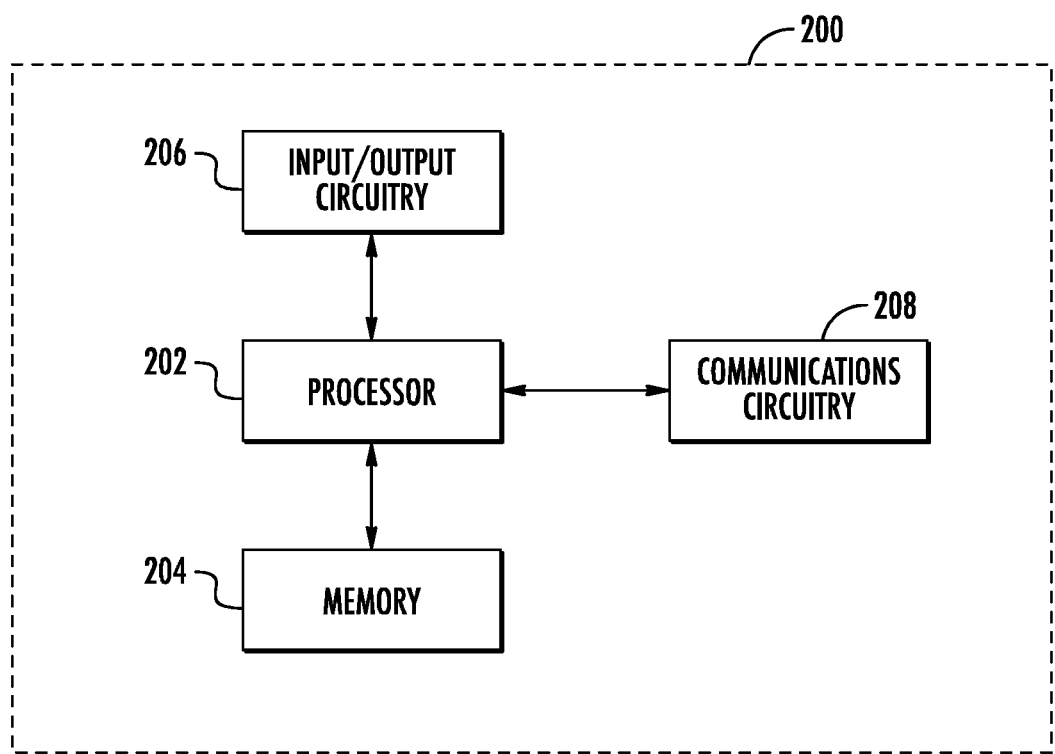
FIG. 2 illustrates a block diagram of an apparatus that may be specifically configured, in accordance with one or more embodiments described herein.

In some embodiments, voice recognition performance system 105 may be embodied by a computing device 102. In some embodiments, the voice recognition performance system 105 and/or the computing device(s) 102 are embodied by one or more computing systems, such as the example apparatus 200 shown in FIG. 2. The apparatus 200 includes processor 202 and memory 204, and can include input/output circuitry 206 and communications circuitry 208. In some embodiments, the apparatus 200 is configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) is in communication with the memory 204 via a bus for passing information among components of the apparatus. The memory 204 is non-transitory and may include, for example, one or more volatile and/or non-volatile memories. In other words, for example, the memory 204 is an electronic storage device (e.g., a computer-readable storage medium). The memory 204 is configured to store information, data, content, applications, instructions, or the like for enabling the apparatus to carry out various functions in accordance with example embodiments disclosed herein.

The processor 202 may be embodied in a number of different ways and may, for example, include one or more processing devices configured to perform independently. In some non-limiting embodiments, the processor 202 includes one or more processors configured in tandem via a bus to enable independent execution of instructions, pipelining, and/or multithreading. The use of the term "processing circuitry" is understood to include a single core processor, a multi-core processor, multiple processors internal to the apparatus, and/or remote or "cloud" processors.

In some embodiments, the processor 202 is configured to execute instructions stored in the memory 204, repository 106, and/or circuitry otherwise accessible to the processor 202. In some embodiments, the processor 202 may be configured to execute hard-coded functionalities. As such, whether configured by hardware or software methods, or by a combination thereof, the processor 202 represents an entity (e.g., physically embodied in circuitry) capable of performing operations according to embodiments disclosed herein while configured accordingly. Alternatively, as another example, when the processor 202 is embodied as an executor of software instructions, the instructions specifically configure the processor 202 to perform the algorithms and/or operations described herein when the instructions are executed.

In some embodiments, the apparatus 200 can include input/output circuitry 206 that is in communication with the processor 202 to provide output (e.g., to a user) and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein is based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
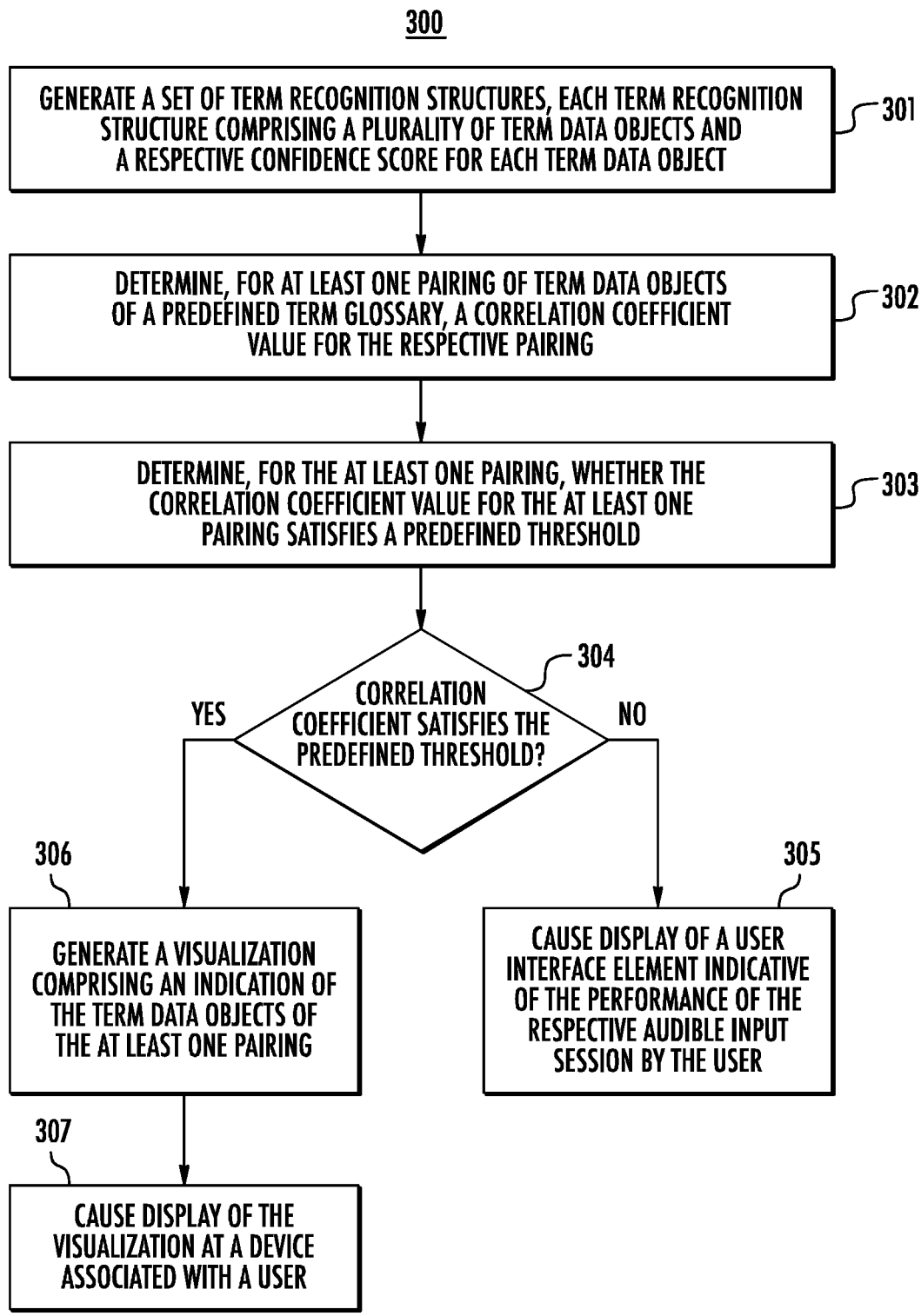
FIG. 3 illustrates a flow diagram of operations related to generating a constellation graph visualization, in accordance with one or more embodiments described herein.

Referring now to FIG. 3, a method 300 illustrates operations performed to determine and provide user-specific feedback based on an analysis of audible input sessions performed by a user. In some embodiments, the voice recognition performance system 105, such as the processor 202, communications circuitry 208, and/or the like, is configured to receive, access or otherwise acquire data related to one or more audible input sessions for a particular user.

At operation 301, the voice recognition performance system 105, such as the processor 202, memory 204, and/or the like, is configured to generate a set of term recognition structures. The set of term recognition structures may be generated based on accessed or otherwise received data related to the one or more audible input sessions for a particular user. In some embodiments, a term recognition structure is a data structure that comprises a plurality of term data objects and a respective confidence score for each term data object. For example, the plurality of term data objects in a term recognition structure may include each term data object of a particular predefined term glossary. In this regard, each term recognition structure may be associated with a respective audible input session performed by a particular user.

Figure 4A:
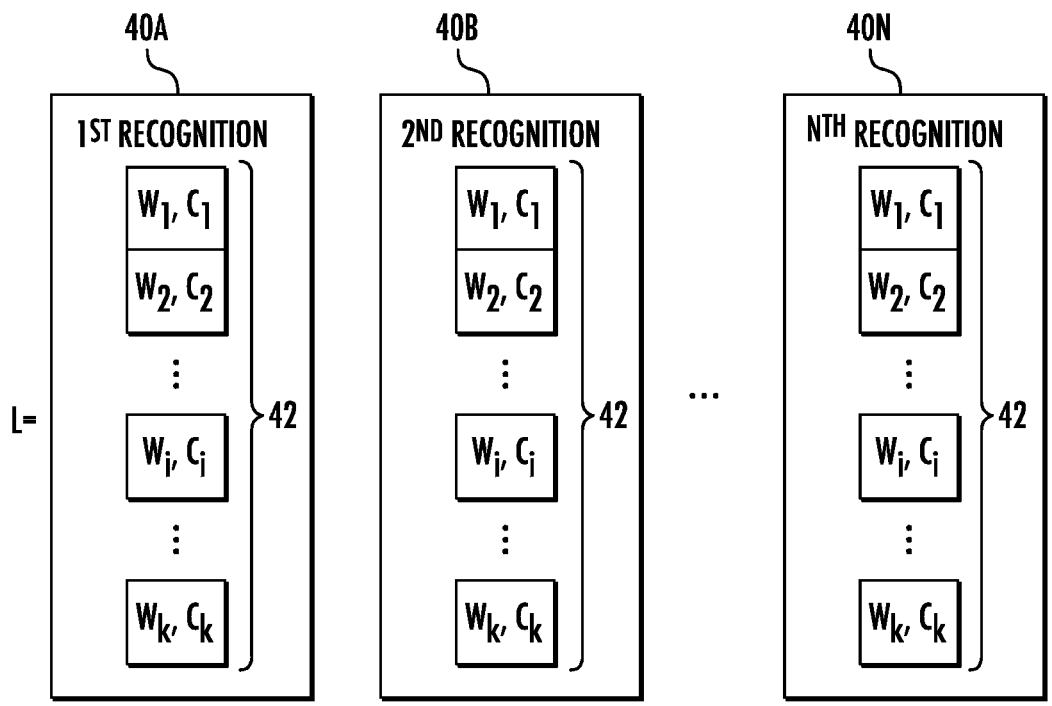
FIG. 4A illustrates an example representation of a set of term recognition structures, in accordance with one or more embodiments described herein.

To illustrate this concept, FIG. 4A shows an example representation of a set, L, of n term recognition structures 40A, 40B, to 40N. Each term recognition structure is associated with a particular recognition of an audible input session by a user. In this regard, as shown, there are n term recognition structures generated for n audible input sessions having been performed (e.g., each time the user spoke). For each of the n term recognition structures for the n audible input sessions, a plurality of term data objects 42 are included. The plurality of term data objects 42 are associated with a respective predefined term glossary utilized for the respective audible input session, and include an indication of a term $w_i$ and an associated confidence score, $c_i$, for each term data object. That is, for each of the n term recognition structures, there is a list of k term data objects 42 where $w_i$ indicates the term, and $c_i$ indicates its confidence score for $1 \leq i \leq k$.

The set of term recognition structures may be generated, in some embodiments, after a predefined number of audible input sessions associated with a user have been performed. In some embodiments, the set of term recognition structures may be generated after a predefined period of time has elapsed. For example, the set of term recognition structures may be generated after a user has completed a task or a series of tasks which includes performing a plurality of audible input sessions (e.g., taking inventory of items within a warehouse). For example, continuing with the above examples in the context of a warehouse, the set of term recognition structures may be generated after a user (e.g., a warehouse employee) has completed all assigned tasks related to audible input sessions for a day.

At operation 302, the voice recognition performance system 105, such as the processor 202, memory 204, and/or the like, is configured to determine, for at least one pairing of term data objects of a predefined term glossary, a correlation coefficient value for the respective pairing. In some embodiments, a correlation coefficient value is determined for each pairing of term data objects of a predefined term glossary. In this regard, in some embodiments, the voice recognition performance system 105, such as the processor 202, memory 204, and/or the like, is configured to access the predefined term glossary set in response to generating the set of term recognition structures.

In some embodiments, the correlation coefficient value for a pairing may be determined a measure of linear correlation between the confidence scores of the term data objects of the pairing, for example, using the Pearson's correlation coefficient (PCC) formula, $$CCV(x, y) = \frac{\text{cov}(x, y)}{\sigma x \sigma y}$$

wherein x represents a list of n confidence scores (e.g., $x_1, x_2, \ldots, x_n$) for a first term in the pairing, y represents a list of n confidence scores (e.g., $y_1, y_2, \ldots, y_n$) for the second term in the pairing, cov(x,y) represents a covariance of x and y, $\sigma x$ represents the standard deviation of x, and $\sigma y$ represents the standard deviation of y. In this regard, the covariance of x and y may be determined by $$\text{cov}(x, y) = \frac{1}{n}\sum_{i=1}^{n}(xi - E(X))(yi - E(Y))$$

wherein E(X) represents the expected value of x, and E(Y) represents the expected value of y. The standard deviation of x, $\sigma x$, may be determined by $$\sigma x = \sqrt{\frac{1}{n}[(x_1 - \mu)^2 + (x_2 - \mu)^2 + \cdots + (x_n - \mu)^2]}$$

wherein $\mu$ represents an average of x. Similarly, the standard deviation of y, $\sigma y$, may be determined by $$\sigma y = \sqrt{\frac{1}{n}[(y_1 - \mu)^2 + (y_2 - \mu)^2 + \cdots + (y_n - \mu)^2]}$$

wherein $\mu$ represents an average of y.

For example, for two terms w1 and w2, in instances in which w1 is assigned a high confidence score, w2 is also assigned a high confidence score. Similarly, in instances in which w1 is assigned a low confidence score, w2 is also assigned a low confidence score. In this regard, the example pairing of w1 and w2 results in a high correlation coefficient value being determined for the pairing. Conversely, in another example, if the confidence scores for w1 and w2 have no bearing on each other, the example pairing of w1 and w2 results in a low correlation coefficient value being determined for the pairing. In some embodiments, correlation coefficient values may range from one (+1) to negative one (−1), where +1 indicates a perfect positive relationship, −1 indicates a perfect negative relationship, and a zero (0) indicates no relationship exists.

Figure 4B:
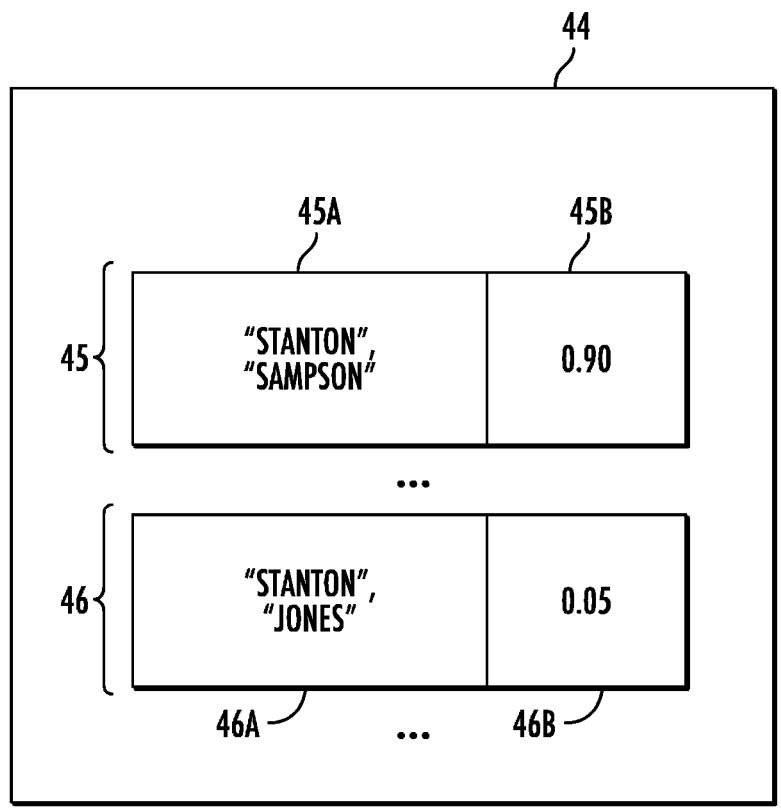
FIG. 4B illustrates an example representation of a term correlation structure, in accordance with one or more embodiments described herein.

In some embodiments, in response to determining the correlation coefficient value for each pairing of a predefined term glossary, the voice recognition performance system 105, such as the processor 202, memory 204, and/or the like, is configured to generate a term correlation structure. A term correlation structure refers to a data structure that comprises a plurality of tuples, with each tuple comprising an indication of a mapping of a particular pairing of term data objects and the determined correlation coefficient value for the particular pairing. For example, in some embodiments, the term correlation structure may comprise an associative array, such as a dictionary, or the like. An example representation of an example term correlation structure is shown in FIG. 4B. As shown, the term correlation structure may comprise a plurality of tuples, with two tuples 45 and 46 shown for example. The tuple 45 includes an indication 45A of a pairing of two term data objects indicative of the terms "Stanton" and "Sampson" as well as an indication 45B of the determined correlation coefficient value for the pairing. Similarly, tuple 46 includes an indication 46A of a pairing of two term data objects indicative of the terms "Stanton" and "Jones" as well as an indication 46B of the determined correlation coefficient value for the pairing. The voice recognition performance system may then analyze the term correlation structure in order to identify pairings to include in a generated visualization, further described below.

In this regard, at operation 303, the voice recognition performance system 105, such as the processor 202, memory 204, and/or the like, is configured to determine, for the at least one pairing, whether the correlation coefficient value for the at least one pairing satisfies a predefined threshold. For example, in some embodiments, the voice recognition structure may iterate through each tuple in the term correlation structure to determine whether the correlation coefficient value for the pairing indicated in the respective tuple meets or exceeds a predefined threshold. The predefined threshold, in some embodiments, may be a predefined value, such as, for example, 0.75. In another embodiment, the predefined threshold may comprise a percentage value, e.g., the highest 10% of correlation coefficient values may be determined to satisfy the predefined threshold.

In some embodiments, at decision point 304, if the voice recognition performance system determines that none of the pairings in the term correlation structure meet or exceed the predefined threshold (e.g., misrecognitions are not occurring or occurring infrequently), the method 300 continues to operation 305, wherein the voice recognition performance system 105, such as the processor 202, communications circuitry 208, and/or the like, is configured to cause display of a user interface element indicative of the performance of the respective audible input session by the user. For example, a user interface element comprising feedback to the user in the form of an indication and/or message that the user is speaking clearly and enunciating properly when performing audible input sessions. For example, the user interface element may be displayed using the voice recognition software at the computing device 102 of the user, e.g., as a push notification, menu overlay, or the like. In this regard, in some embodiments, the voice recognition performance system 105 provides the user with feedback indicative of an acceptable performance of audible input sessions by the user. For example, the user interface element, in some embodiments, may display text such as "You are performing voice input accurately, keep it up!"

Returning to decision point 304, if the voice recognition performance system 105 determines that one or more of the pairings in the term correlation structure meet or exceed the predefined threshold, the method 300 continues to operation 306, wherein the voice recognition performance system 105, such as the processor 202, memory 204, and/or the like, is configured to generate a visualization comprising an indication of the term data objects of the at least one pairing.

Figure 5A:
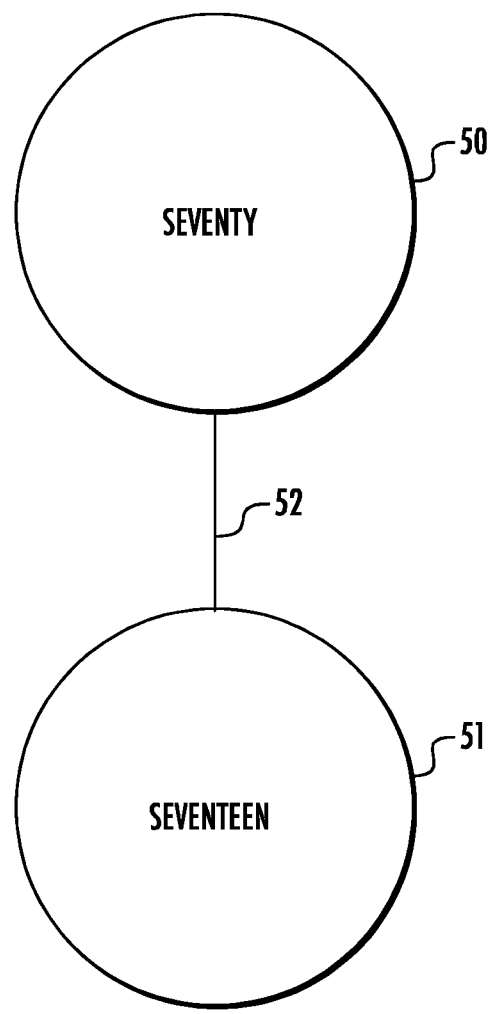
FIG. 5A illustrates an example representation of a constellation graph visualization, in accordance with one or more embodiments described herein.
Figure 5B:
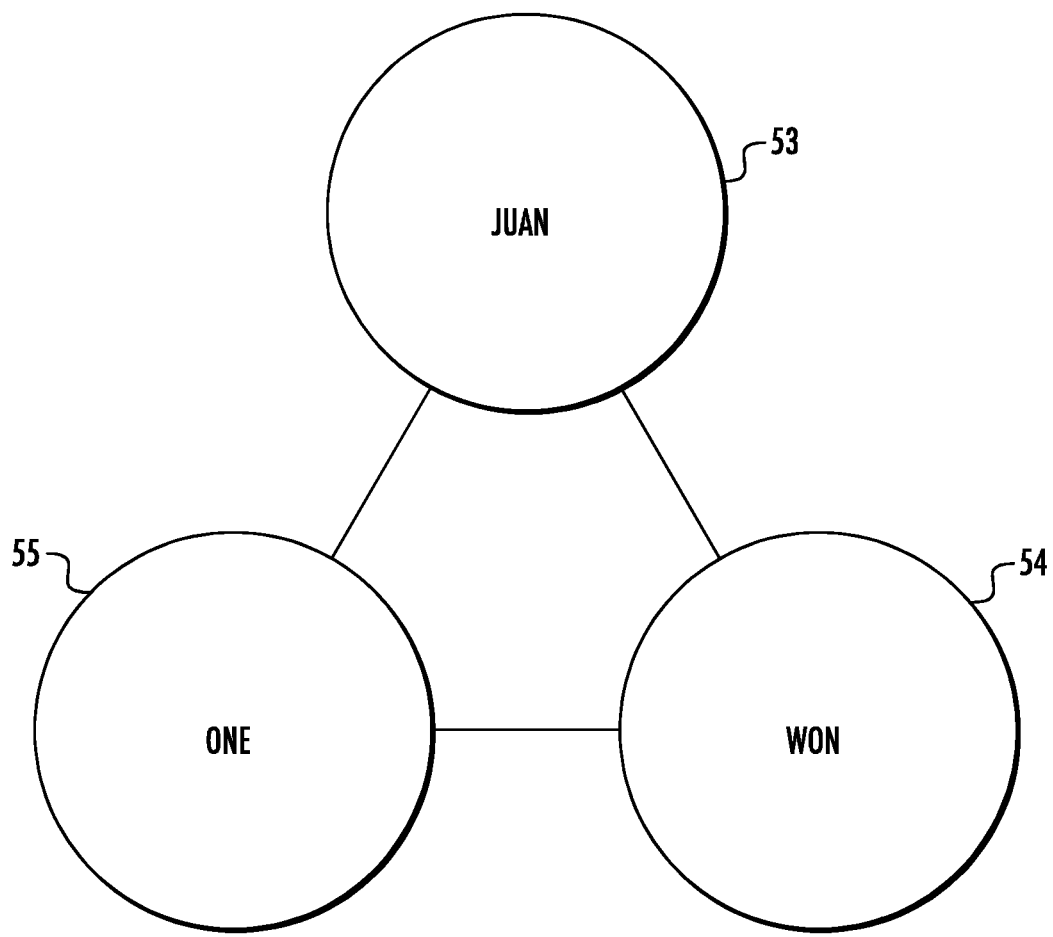
FIG. 5B illustrates an example representation of a constellation graph visualization, in accordance with one or more embodiments described herein.
Figure 5C:
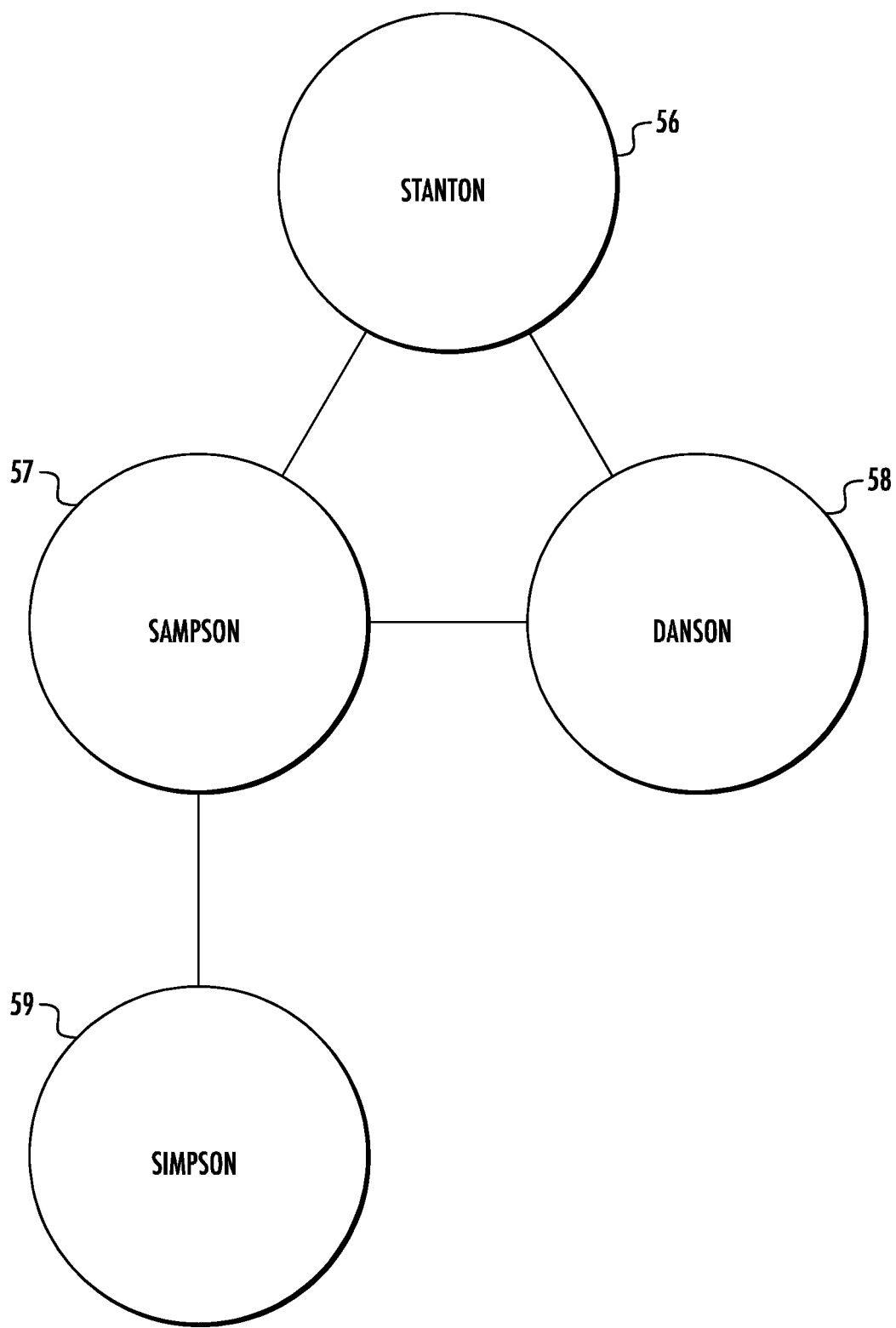
FIG. 5C illustrates an example representation of a constellation graph visualization, in accordance with one or more embodiments described herein.

For example, in some embodiments, the visualization comprises one or more constellation graphs (see e.g., FIGS. 5A-C). Each constellation graph may comprise a plurality of nodes, with at least two nodes of the plurality of nodes being visually connected. Nodes that are visually connected are each indicative of a term data object of a respective pairing. At operation 307, the voice recognition performance system 105, such as the processor 202, communications circuitry 208, and/or the like, is configured to cause display of the visualization at a device associated with a user.

To illustrate this concept, FIGS. 5A, 5B, and 5C depict example generated visualizations comprising constellation graphs that may be displayed at the device of the user. FIG. 5A shows a first node 50 indicative of the term "seventy" and a second node 51 indicative of the term "seventeen." The first node 51 and second node 52 are visually connected (e.g., by a line 52), indicating that the terms in the first node 51 and second node 52 are likely to be misinterpreted for each other by the voice recognition software. By displaying this example constellation graph, a user is provided with user-specific feedback as to how the voice recognition software interpreting a particular term when spoken by the user. Though FIGS. 5A, 5B, and 5C depict a small plurality of connected nodes, it is to be appreciated that there is no restriction on how many terms a particular term may share a correlation coefficient value with that satisfies the predefined threshold. In this regard, continuing with the above warehouse context example, a user performing an inventory count may encounter misrecognitions when speaking the term "seventeen." In this regard, the user may not be enunciating the "n" of "seventeen," leading to a misrecognition by the voice recognition software. As described above, the term data objects representative of "seventeen" and "seventy" may each be assigned high confidence scores each time one of the terms is spoken, leading to a high correlation coefficient value for the pairing.

As another example, FIG. 5B shows another example generated visualization comprising a constellation graph that may be displayed at the device of the user. As shown, a constellation graph may comprise indications of more than one pairing of term data objects. In this regard, a first node 53 indicative of the term "Juan," a second node 54 indicative of the term "won," and a third node 55 indicative of the term "one" are visually connected. In this regard, the pairing of term data objects "Juan" and "won," "Juan" and "one," and "won" and "one" are each associated with a high correlation coefficient value, such that misrecognitions may occur or are likely to occur when the user speaks one or all of these terms.

As another example, FIG. 5C shows another example generated visualization comprising a constellation graph that may be displayed at the device of the user. As shown, a first node 56 indicative of the term "Stanton," a second node 57 indicative of the term "Sampson," and a third node 58 indicative of the term "Danson" are visually connected. In this regard, the pairing of term data objects "Sampson" and "Stanton," "Sampson" and "Danson," and "Stanton" and "Danson" are each associated with a high correlation coefficient value, such that misrecognitions may be occurring or are likely to occur when the user speaks one or all of these terms (e.g., while performing a task such as taking attendance of employees of a warehouse in the example described above). Additionally, a fourth node 59 indicative of the term "Simpson" is visually connected to node 57 indicative of "Sampson," but not visually connected to nodes 56 and 58. In this regard, the user-specific constellation graph informs the user that the voice recognition software may be misrecognizing the term "Simpson" for "Sampson" when the user speaks the term "Simpson."

In some embodiments, the visualization further comprises information related to one or more corrective actions associated with the term data objects of the at least one pairing. For example, a node may be further indicative of a phonetic respelling of a particular term data object, such as a pronunciation respelling in order to inform the user on how to properly pronounce the particular term. A pronunciation respelling is a respelling of a term that has a standard spelling but whose pronunciation according to that spelling may be ambiguous. Additionally or alternatively, a node may be further indicative of a syllabification of a term, wherein term is displayed within the node having the syllables of the term divided by an interpunct, hyphen, space, and/or the like.

Additionally or alternatively, in some embodiments, a portion of a term within a node may be emphasized (e.g., through boldened, italicized, colored, and/or underlined text, and/or the like) in order to inform the user on how to properly pronounce the particular term. For example, in an example constellation graph wherein a first node indicative of the term "want," a second node indicative of the term "wane," and a third node indicative of the term "won" are visually connected, the letter "t" in "want" may be emphasized in order to inform the user that the letter "t" is an important distinguishing sound when enunciating the term "want."

Additionally or alternatively, a node indicative of a particular term may be further indicative of a suggested synonym for the term. For example, a node indicative of the term "one" may additionally include one or more synonyms of "one," such as the term "single," in order to provide the user with another option in case the user experiences consistent misrecognitions when providing the term "one" as voice input to the voice recognition software.

In some embodiments, term data objects included in the nodes of a constellation graph (e.g., term data objects whose correlation coefficient value satisfies the predefined threshold described above) may be used by the voice recognition software to initiate a retraining process for voice input by the user. For example, the voice recognition software may provide a process of prompting the user to provide voice input of a particular word or phrase a predefined number of times to the voice recognition software in order to adapt to a user's particular enunciation of the word or phrase that is likely causing misrecognitions to occur.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

What is claimed is:

1. An apparatus comprising at least one processor and at least one non-transitory memory including program code, the at least one non-transitory memory and the program code configured to, with the processor, cause the apparatus to:
generate a set of term recognition structures based on one or more audible input sessions performed by a user, each term recognition structure comprising a plurality of term data objects of a predefined term glossary and a predetermined confidence score for each term data object;
wherein each term data object is representative of a particular term or word spoken by the user during the one or more audible input sessions; and
wherein the predetermined confidence score is defined as acceptance of term data object in the predefined term glossary;
determine, for at least one pairing of the term data objects of the predefined term glossary, a correlation coefficient value for the respective pairing;
wherein the correlation coefficient value is determined based on the predetermined confidence score for each term data object of the at least one pairing of the term data objects;
determine, for the at least one pairing, whether the correlation coefficient value for the at least one pairing satisfies a predefined threshold;
in accordance with determining that the correlation coefficient value for the at least one pairing satisfies the predefined threshold:
generate a visualization comprising an indication of the term data objects of the at least one pairing; and
cause display of the visualization at a device associated with the user.

2. The apparatus of claim 1, wherein the visualization comprises a constellation graph comprising a plurality of nodes with at least two nodes of the plurality of nodes being visually connected, wherein the at least two nodes each indicative of the term data objects of the at least one pairing.

3. The apparatus of claim 1, wherein the at least one non-transitory memory and the program code are further configured to, with the processor, cause the apparatus to:
in an instance in which the at least one pairing fails to satisfy the predefined threshold:
cause display of a user interface element indicative of the performance of the respective audible input session by the user.

4. The apparatus of claim 1, wherein the at least one non-transitory memory and the program code are further configured to, with the processor, cause the apparatus to:
store a predefined term glossary set comprising at least one predefined term glossary; and
access the predefined term glossary set in response to generating the set of term recognition structures.

5. The apparatus of claim 1, wherein the plurality of term data objects of a respective term recognition structure of the set of term recognition structures comprise each term object of a respective predefined term glossary.

6. The apparatus of claim 1, wherein the visualization further comprises information related to one or more corrective actions associated with the term data objects of the at least one pairing.

7. The apparatus of claim 1, wherein the correlation coefficient value is determined based at least on the predetermined confidence scores of the term data objects in the set of term recognition structures.

8. A computer-implemented method comprising:
generating a set of term recognition structures based on one or more audible input sessions performed by a user, each term recognition structure comprising a plurality of term data objects of a predefined term glossary and a predetermined confidence score for each term data object, wherein each term recognition structure is associated with a respective audible input session performed by a user; and
wherein the predetermined confidence score is defined as acceptance of term data object in the predefined term glossary;
determining, for at least one pairing of the term data objects of ft the predefined term glossary, a correlation coefficient value for the respective pairing, the correlation coefficient value being determined based at least on the predetermined confidence scores of the term data objects in the set of term recognition structures;
determining, for the at least one pairing, whether the correlation coefficient value for the at least one pairing satisfies a predefined threshold;
in accordance with determining that the correlation coefficient value for the at least one pairing satisfies the predefined threshold, generating a visualization comprising an indication of the term data objects of the at least one pairing; and
causing display of the visualization at a device associated with the user.

9. The computer-implemented method of claim 8, wherein the visualization comprises a constellation graph comprising a plurality of nodes with at least two nodes of the plurality of nodes being visually connected, wherein the at least two nodes each indicative of the term data objects of the at least one pairing.

10. The computer-implemented method of claim 8, further comprising:
in an instance in which the at least one pairing fails to satisfy the predefined threshold;
causing display of a user interface element indicative of the performance of the respective audible input session by the user.

11. The computer-implemented method of claim 8, further comprising:
storing a predefined term glossary set comprising at least one predefined term glossary; and
accessing the predefined term glossary set in response to generating the set of term recognition structures.

12. The computer-implemented method of claim 8, wherein the plurality of term data objects of a respective term recognition structure of the set of term recognition structures comprises each term object of a predefined term glossary.

13. The computer-implemented method of claim 8, wherein the visualization further comprises information related to one or more corrective actions associated with the term data objects of the at least one pairing.

14. The computer-implemented method of claim 8, wherein the correlation coefficient value is determined based at least on the predetermined confidence scores of the term data objects in the set of term recognition structures.

15. A computer program product comprising at least one non-transitory computer readable storage medium having computer-readable program code portions stored therein, the computer-readable program code portions comprising an executable portion configured to:

generate a set of term recognition structures based on one or more audible input sessions performed by a user, each term recognition structure comprising a plurality of term data objects of a predefined term glossary and a predetermined confidence score for each term data object, wherein each term data object recognition structure is associated with a respective audible input session performed by a user; and wherein the predetermined confidence score is defined as acceptance of term data object in the predefined term glossary;

determine, for at least one pairing of the term data objects of the predefined term glossary, a correlation coefficient value for the respective pairing, the correlation coefficient value being determined based at least on the predetermined confidence scores of the term data objects in the set of term recognition structures;

determine, for the at least one pairing, whether the correlation coefficient value for the at least one pairing satisfies a predefined threshold;

in accordance with determining that the correlation coefficient value for the at least one pairing satisfies the predefined threshold, generate a visualization comprising an indication of the term data objects of the at least one pairing; and cause display of the visualization at a device associated with the user.

16. The computer program product of claim 15, wherein the visualization comprises a constellation graph comprising a plurality of nodes with at least two nodes of the plurality of nodes being visually connected, wherein the at least two nodes each indicative of the term data objects of the at least one pairing.

17. The computer program product of claim 15, wherein the computer-readable program code portions comprising the executable portion are further configured to:
   in an instance in which the at least one pairing fails to satisfy the predefined threshold;
      cause display of a user interface element indicative of the performance of the respective audible input session by the user.

18. The computer program product of claim 15, wherein the plurality of term data objects of a respective term recognition structure of the set of term recognition structures comprise each term object of a respective predefined term glossary.

19. The computer program product of claim 15, wherein the visualization further comprises information related to one or more corrective actions associated with the term data objects of the at least one pairing.

20. The computer program product of claim 15, wherein the correlation coefficient value is determined based at least on the predetermined confidence scores of the term data objects in the set of term recognition structures.

* * * * *